United States Patent
Kim et al.

(10) Patent No.: US 9,219,437 B2
(45) Date of Patent: Dec. 22, 2015

(54) POSITION SIGNAL COMPENSATION UNIT OF MOTOR, AND MOTOR INCLUDING THE SAME

(71) Applicant: Electronics and Telecommunications Research Institute, Daejeon (KR)

(72) Inventors: Minki Kim, Daejeon (KR); Yil Suk Yang, Daejeon (KR); Jimin Oh, Daejeon (KR); Jung Hee Suk, Daejeon (KR); Sewan Heo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 55 days.

(21) Appl. No.: 14/148,142

(22) Filed: Jan. 6, 2014

(65) Prior Publication Data
US 2015/0002062 A1    Jan. 1, 2015

(30) Foreign Application Priority Data
Jun. 27, 2013 (KR) .......... 10-2013-0074538

(51) Int. Cl.
   *H02P 6/16* (2006.01)
(52) U.S. Cl.
   CPC ........................ *H02P 6/16* (2013.01)
(58) Field of Classification Search
   CPC ........................................... H02P 6/16
   USPC ............ 318/400.07, 400.04, 400.01, 700
   See application file for complete search history.

(56) References Cited

U.S. PATENT DOCUMENTS

| 5,838,123 A | 11/1998 | Zhao |
| 6,694,287 B2 * | 2/2004 | Mir et al. ............... 702/183 |
| 7,141,943 B2 * | 11/2006 | Song et al. ............ 318/400.34 |
| 7,906,929 B2 * | 3/2011 | Krause et al. ............... 318/599 |

FOREIGN PATENT DOCUMENTS

| KR | 10-0600751 B1 | 7/2006 |
| KR | 10-0645809 B1 | 11/2006 |
| KR | 10-2012-0063152 A | 6/2012 |

OTHER PUBLICATIONS

Motoshi Matsushita et al., "Sine-Wave Drive for PM Motor Controlling Phase Difference between Voltage and Current by Detecting Inverter Bus Current", Proceeding of International Conference on Electrical Machines and Systems 2007, pp. 740-745, Oct. 2007.

* cited by examiner

*Primary Examiner* — David S Luo
(74) *Attorney, Agent, or Firm* — Rabin & Berdo, P.C.

(57) ABSTRACT

Provided is a motor including a motor driving unit outputting a plurality of switching signals and any one of estimated three-phase voltages, in response to a control signal and a compensated position signal; a pulse width modulation (PWM) inverter outputting three-phase voltages and any one of estimated three-phase currents corresponding to the one estimated phase voltage, in response to the plurality switching signals; a motor unit operating based on the three-phase voltages and outputting a position signal according to the operation; and a position signal compensation unit receiving the position signal, the estimated phase voltage and the estimated phase current, detecting a phase difference between the estimated phase voltage and the estimated phase current and compensating for the position signal in response to the detected phase difference.

12 Claims, 3 Drawing Sheets

POSITION SIGNAL COMPENSATION UNIT OF MOTOR, AND MOTOR INCLUDING THE SAME

CROSS-REFERENCE TO RELATED APPLICATIONS

This U.S. non-provisional patent application claims priority under 35 U.S.C. §119 of Korean Patent Application No. 10-2013-0074538, filed on Jun. 27, 2013, the entire contents of which are hereby incorporated by reference.

BACKGROUND OF THE INVENTION

The present invention disclosed herein relates to a motor, and more particularly, to a position signal compensation unit of a motor, and motor including the same.

A motor is a device that converts electric energy into mechanical energy by using force applied to a current in a magnetic field. The motor is classified into an alternating current (AC) motor and a direct current (DC) motor according to the type of an input power source. AC motors supply currents to the winding of stators, change magnetic fields and rotate rotors. DC motors supply constant currents to rotors and rotate the rotors. In this case, the DC motor uses a brush and enables currents to flow in a certain direction irrespective of a rotor position.

Recently, as an electronics control technology develops, a DC motor not using a brush by using an electronic switching technology, namely, a brushless direct current (BLDC) motor has been provided. Since the BLDC motor does not use the brush, it has no drawbacks, such as heat emission due to mechanical friction and brush's wear. However, there is a need for a separate device for detecting a rotor position in order to control the BLDC motor.

SUMMARY OF THE INVENTION

The present invention provides a position signal compensation unit of a motor, and a motor including the same that automatically compensate for a rotor position.

Embodiments of the present invention provide motors include a motor driving unit outputting a plurality of switching signals and any one of estimated three-phase voltages, in response to a control signal and a compensated position signal; a pulse width modulation (PWM) inverter outputting three-phase voltages and any one of estimated three-phase currents corresponding to the one estimated phase voltage, in response to the plurality switching signals; a motor unit operating based on the three-phase voltages and outputting a position signal according to the operation; and a position signal compensation unit receiving the position signal, the estimated phase voltage and the estimated phase current, detecting a phase difference between the estimated phase voltage and the estimated phase current and compensating for the position signal in response to the detected phase difference.

In other embodiments of the present invention, position signal compensation units of motors include a first comparator receiving any one of estimated three-phase voltages and outputting a voltage signal in response to comparing voltage levels of the received estimated phase voltage and a ground voltage; a second comparator receiving any one of estimated three-phase currents and outputting a current signal in response to comparing current levels of the received estimated phase current and a ground current; a first phase detecting unit detecting a phase difference between the voltage signal and the current signal; a second phase detecting unit detecting phase diagnosis between the voltage signal and the current signal; and a compensation unit receiving a position signal based on a position of a rotor included in the motor and compensating for the position signal in response to the detected phase difference and the detected phase diagnosis.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
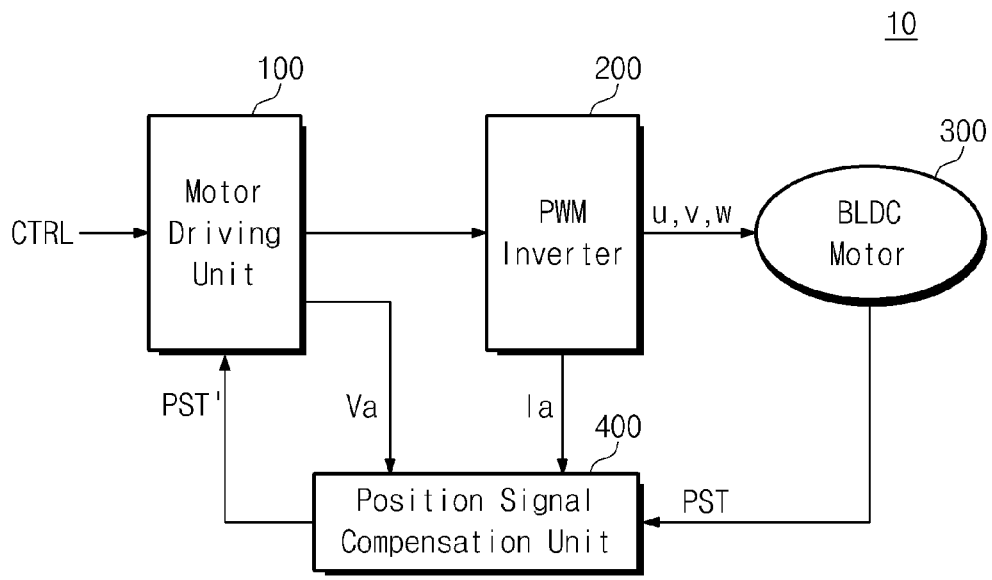
FIG. 1 is a block diagram of a motor system according to an embodiment of the present invention.

Hereinafter, preferred embodiments of the present invention will be described with reference to the accompanying drawings to fully explain the present invention in such a manner that it may easily be carried out by a person with ordinary skill in the art to which the present invention pertains. The same components are denoted by using the same reference numerals. Like components are denoted by using similar reference numerals. A motor according to the present invention as will be described and operations to be performed by using the motor are merely examples and may make various changes and alterations within the scope of the technical spirit of the present invention.

In describing the present invention, the motor may be described that it is implemented as a brushless direct current (BLDC) motor. Also, the BLDC motor may be described as a motor that includes hall element-based position sensors in order to detect position signals. The BLDC motor according to the present invention may be described based on the detection of a rotor position, and speed information on the BLDC motor may be obtained based on the detection of the rotor position.

FIG. 1 is a block diagram of a motor system according to an embodiment of the present invention. Referring to FIG. 1, a BLDC motor system 10 includes a motor driving unit 100, a pulse width modulation (PWM) inverter 200, a BLDC motor unit 300, and a position signal compensation unit 400.

The motor driving unit 100 receives a control signal CTRL from the outside and a compensated position signal PST' from the position signal compensation unit 400. The motor driving unit 100 controls the PWM inverter 200 in response to the received control signal CTRL and the received compensated position signal PST'. Specifically, the motor driving unit 100 outputs a plurality of switching signals that control the PWM inverter 200 in response to the received control signal CTRL and the received compensated position signal PST'.

Unlike the motor driving unit 100 according to the present invention, a typical motor driving unit does not receive a compensated position signal but directly receives a position signal from the BLDC motor. The position signal received from the BLDC motor includes an error of a rotor position due to design, manufacturing, or external impact. Thus, a typical motor driving unit needs position compensation data that needs compensation according to the error of the rotor position. Thus, the typical motor driving unit includes a look-up table that stores position error vs. position compensation data.

However, since the error of the rotor position varies depending on an external condition and the driving condition of the motor, there is a limitation in that a lot of time is needed to create the look-up table. Also, there is a need for a memory for storing the look-up table.

The motor driving unit 100 of the present invention does not receive a position signal PST including a position error but receives a position signal PST' compensated through the position signal compensation unit 400. Thus, the motor driving unit 100 has no need to include position compensation data that compensates for the position error. In other words, the motor driving unit 100 has no need to create the look-up table that is stored based an external condition and the driving condition of the motor.

The PWM inverter 200 outputs three-phase voltages u, v and w according to the control of the motor driving unit 100. In embodiments, the PWM inverter 200 may include six switching devices. The PWM inverter 200 controls six switching devices in response to a plurality switching signals that are output from the motor driving unit 100. The PWM inverter 200 controls the six switching devices to be able to output three-phase voltages u, v and w.

In embodiments, the plurality of switching devices included in the PWM inverter 200 may be provided based on a power semiconductor device, such as an insulated gate bipolar mode transistor (IGBT), a gate turn-off thyristor (GTO), a power diode, etc. In embodiments, the three-phase voltages u, v and w may have the form of a sinusoidal wave including a harmonic wave. Also, in embodiments, the motor driving unit 100 and the PWM inverter 200 may be provided as a motor driving module.

The BLDM motor unit 300 operates in response to the three-phase voltages u, v and w that are output from the PWM inverter 200. In embodiments, the BLDC motor unit 300 may be a motor that includes hall element-based position sensors. The hall element may be an element measuring the intensity of a magnetic field. The BLDC motor unit 300 may include hall element-based first to third position sensors (not shown). The first to the third position sensors measure and output the intensity of a magnetic field that varies depending on the rotation of a rotor.

The first to the third position sensors may be located at fixed positions in order to sense a rotor position. In an ideal case, the intervals of the first to the third position sensors will have an angle of 120. However, due to design, manufacturing, or external impact, the positions of the first to the third position sensors may be changed. The angle of the changed position is referred to as a position error.

Also, the BLDC motor unit 300 includes a rotor and a stator. The rotor may be provided as a permanent magnet, and the stator receives three-phase voltages u, v and w. Since the fundamental waves of the three-phase voltages u, v and w are sinusoidal waves that have specific frequencies, a magnetic field generated from the stator by the three-phase voltages u, v and w varies. Electromagnetic force is generated according to electromagnetic induction based on the direction of the varying magnetic field. The rotor may be rotated by the generated electromagnetic force.

Also, in embodiments, the BLDC motor unit 300 may operate with sinusoidal wave currents according to a 180° driving scheme. A BLDC motor according to a 120°·driving scheme operates with square wave currents based on a 60° interval position signal. However, the BLDC motor according to the 120°·driving scheme has an advantage in that cost is low, but has drawbacks, such as torque ripple and noise. Thus, the BLDC motor unit 300 according to the present invention may operate with sinusoidal wave currents according to a 180°·driving scheme in order to decrease torque ripple.

The position signal compensation unit 400 receives the position signal PST from position sensors that are included in the BLDC motor unit 300. The position signal compensation unit 400 may generate the compensated position signal PST' in response to received position signals.

Specifically, the position signal compensation unit 400 receives a phase voltage Va from the motor driving unit 100 and a phase current Ia from the PWM inverter 200. The phase voltage Va and the phase current Ia may be a phase voltage and a phase current that are applied to any one phase among voltages and currents applied to three phases of the BLDC motor unit 300. Also, in embodiments, the phase voltage Va and the phase current Ia may be sinusoidal signals.

The position signal compensation unit 400 detects the phase difference between the received phase voltage Va and the received phase current Ia. The position signal compensation unit 400 may estimate the position error of the position signal PST according to the detected phase difference. The position signal compensation unit 400 may compensate for the position signal PST received from the BLDC motor unit 300, according to the estimated position error. The position single compensation unit 400 delivers the compensated position signal PST' to the motor driving unit 100.

Figure 2:
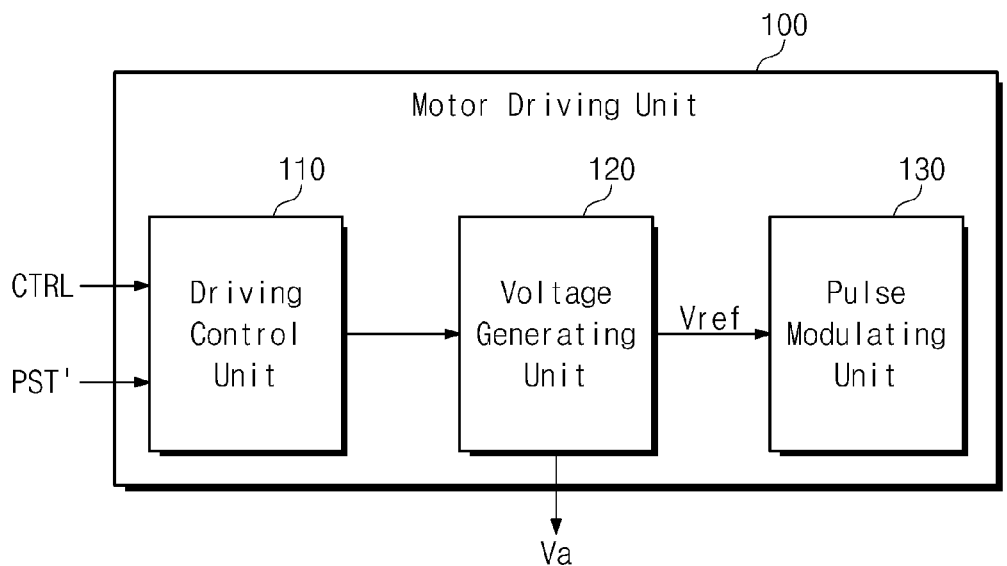
FIG. 2 is a block diagram of a motor driving unit in FIG. 1.

FIG. 2 is a block diagram of the motor driving unit in FIG. 1. Referring to FIG. 2, the motor driving unit 100 includes a driving control unit 110, a voltage generating unit 120, and a pulse modulating unit 130.

The driving control unit 110 receives a control signal CTRL form the outside and a compensated position signal PST' from the position signal compensation unit 400. The driving control unit 110 controls the phase of a reference voltage Vref in response to the compensated position signal PST'.

The driving control unit 110 receives the control signal CTRL and controls the amplitude or the frequency of the reference voltage Vref. For example, the control signal CTRL may include desired-speed information on the BLDC motor unit 300. The driving control unit 110 may control the amplitude or the frequency of the reference voltage Vref based on the desired-speed information.

Specifically, if the speed of the BLDC motor unit 300 is lower than the desired speed, the driving control unit 110 may increase the amplitude of the reference voltage Vref or raise the frequency thereof. On the contrary, if the speed of the BLDC motor unit 300 is higher than the desired speed, the driving control unit 110 may decrease the amplitude of the reference voltage Vref or lower the frequency thereof.

The voltage generating unit 120 may generate the reference voltage Vref according to the control of the driving control unit 110. The generated reference voltage Vref is transmitted to the pulse modulating unit 130. As an example, the form of the reference voltage Vref may vary depending on a PWM modulation scheme.

Also, the voltage generating unit 120 delivers any one Va of three-phase voltages to the position signal compensation unit 400 (See FIG. 1) based on the reference voltage Vref. The reason for what each of the three-phase voltages from the voltage generating unit 120 is not delivered to the position signal compensation unit 400 but only one phase voltage Va is delivered is because the position error between the three-phase voltages equally occurs. As an example, each of the three-phase voltages may have a phase difference of 120.

Also, in embodiments, three-phase voltages u, v and w to be applied to the BLDC motor unit 300 may be estimated based on the three-phase voltages that are generated from the voltage generating unit 120.

The pulse modulating unit 130 may output a plurality of switching signals based on the received reference voltage Vref.

Figure 3:
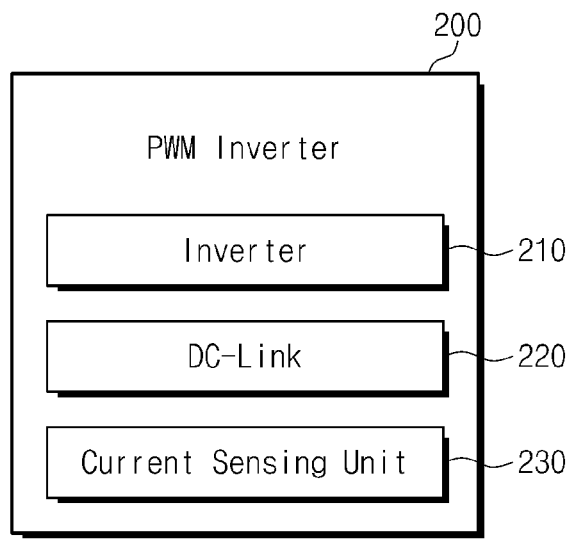
FIG. 3 is a block diagram of a pulse width modulation (PWM) inverter in FIG. 1.

FIG. 3 is a block diagram of a pulse width modulation (PWM) inverter in FIG. 1. Referring to, the PWM inverter 200 includes an inverter 210, a DC-link 220, and a current sensing unit 230.

The inverter 210 receives a plurality of switching signals from the pulse modulating unit 130 and outputs three-phase voltages u, v and w based on the received switching signals. The DC-link 220 supplies power so that the inverter 210 may output the three-phase voltages u, v and w. As an example, the three-phase voltages u, v and w may have sinusoidal forms according to a 180° driving scheme. As an example, the maximum value of the three-phase voltages u, v and w may be the voltage VDC of the DC-link 220.

The current sensing unit 230 may sense three-phase currents based on the three-phase voltages u, v and w that are applied from the inverter 210 to the BLDC motor unit 300. The current sensing unit 230 delivers any one Ia of the sensed three-phase currents to the position signal compensation unit 400 (See FIG. 1). Likewise, the reason for what each of the three-phase currents from the current sensing unit 230 is not delivered to the position signal compensation unit 400 but only one phase current Ia is delivered is because the position error between the three-phase currents equally occurs. In embodiments, the current sensing unit 230 may sense the three-phase currents by using a current sensor scheme and a resistor scheme, as schemes for sensing the three-phase currents.

Figure 4:
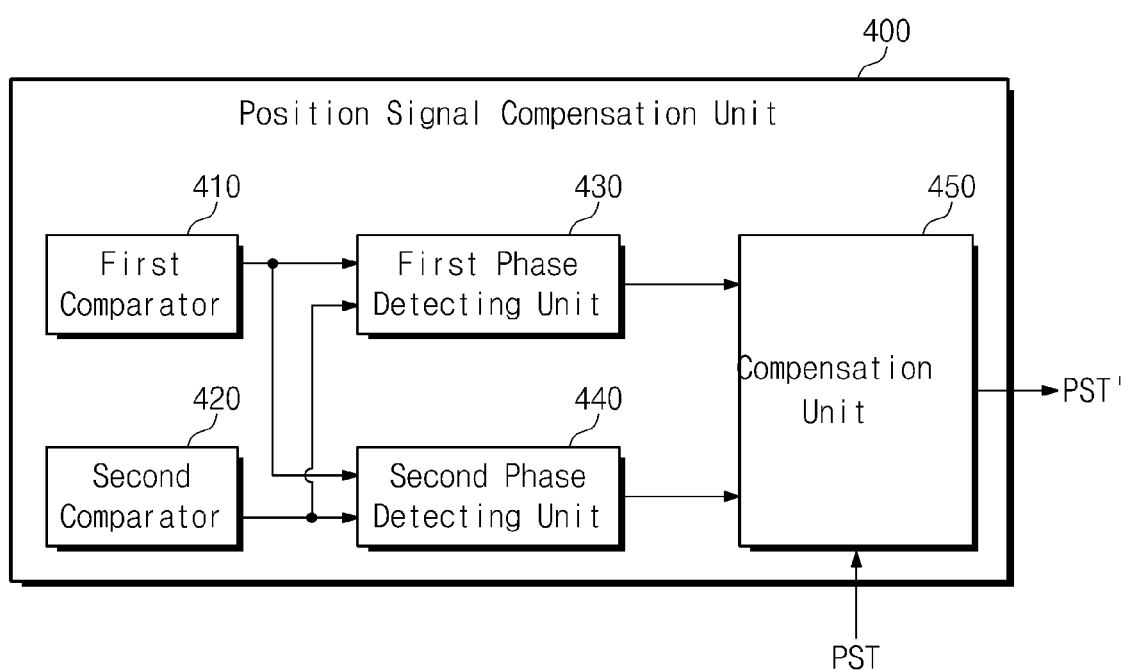
FIG. 4 is a block diagram of a position signal compensation unit in FIG. 1.

FIG. 4 is a block diagram of a position signal compensation unit in FIG. 1. Referring to FIG. 4, the position signal compensation unit 400 includes a first comparator 410, a second comparator 420, a first phase detecting unit 430, a second phase detecting unit 440, and a compensation unit 450.

The first comparator 410 receives the phase voltage Va from the voltage generating unit 120 (See FIG. 2). In embodiments, the phase voltage Va may be a sinusoidal wave. The first comparator 410 generates a voltage signal according to comparing the voltage levels of the received phase voltage Va and the ground voltage. The first comparator 410 delivers the generated voltage signal to the first and the second phase detecting units 430 and 440.

The second comparator 420 receives the phase current Ia from the current sensing unit 230 (See FIG. 3). In embodiments, the phase current Ia may be a sinusoidal wave. The second comparator 420 generates a current signal according to comparing the current levels of the received phase current Ia and the ground current. The second comparator 420 delivers the generated current signal to the first and the second phase detecting units 430 and 440.

The first phase detecting unit 430 receives the voltage signal and the current signal from the first and the second comparators 410 and 420. The first phase detecting unit 430 performs logical operation on the received voltage signal and the received current signal to be able to detect the phase difference signal between the two signals. The first phase detecting unit 430 delivers the detected phase difference signal to the compensation unit 450.

Likewise, the second phase detecting unit 440 receives the voltage signal and the current signal from the first and the second comparators 410 and 420. The second phase detecting unit 440 may detect phase diagnosis for the leading phase or the lagging phase between two signals based on the received voltage signal and the received current signal. For example, the second phase detecting unit 440 may detect a phase diagnosis signal corresponding to a leading phase if the phase of the voltage signal leads the phase of the current signal. On the contrary, the second phase detecting unit 440 may detect a phase diagnosis signal corresponding to a lagging phase if the phase of the current signal leads the phase of the voltage signal.

The compensation unit 450 receives the phase difference signal and the phase diagnosis signal from the first and the second phase detecting units 430 and 440. The compensation unit 450 may compensate for the position error of the position signal PST received from the BLDC motor unit 300 in response to the received phase difference signal and the received phase diagnosis signal. The compensation unit 450 delivers the compensated position signal PST' to the motor driving unit 100 (See FIG. 1) based on the received position signal PST.

As described above, the position signal compensation unit 400 may compensate for the position error included in the position signal PST, based on the phase voltage Va and the phase current Ia. The operation of the position signal compensation unit 400 is described in detail with reference to FIG. 5.

Figure 5:
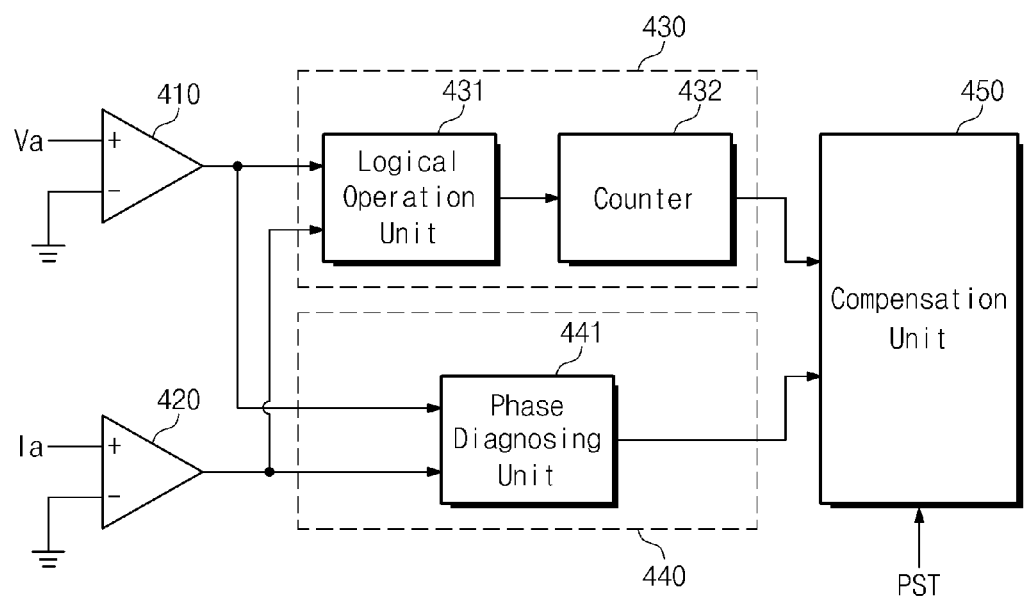
FIG. 5 is a circuit diagram of the position signal compensation unit in FIG. 1.

FIG. 5 is a circuit diagram of the position signal compensation unit in FIG. 1. Referring to FIG. 5, the first comparator 410 outputs a voltage signal according to comparing the voltage levels of the phase voltage Va and the ground voltage. In embodiments, the phase voltage Va is implemented as a sinusoidal signal and if the level of the phase voltage Va is higher than the level of the ground voltage, the first comparator 410 outputs a high-level voltage signal. On the contrary, if the level of the phase voltage Va is lower than that of the ground voltage, the first comparator 410 outputs a low-level voltage signal.

The second comparator 420 outputs a current signal according to the voltage levels of the phase current Ia and the ground current. In embodiments, the phase current Ia is implanted as a sinusoidal signal and if the level of the phase current Ia is higher than the level of the ground current, the second comparator 420 outputs a high-level current signal. On the contrary, if the level of the phase current Ia is lower than that of the ground current, the second comparator 420 outputs a low-level current signal.

The first phase detecting unit 430 includes a logical operation unit 431 and a counter 432. The logical operation unit 431 receives the voltage signal from the first comparator 410 and the current signal from the second comparator 420. In embodiments, the logical operation unit 431 may be an exclusive OR (XOR) operation unit. The logical operation unit 431 detects the phase difference according to the operation result between the received voltage signal and the received current signal. The logical operation unit 431 outputs detected phase difference information to the counter 432.

The counter 432 receives the phase difference information from the logical operation unit 431 and detects a count corresponding to the received phase difference information. The counter 432 may generates a phase difference signal in response to the detected count. The counter 432 delivers the generated phase difference signal to the compensation unit 450.

The second phase detecting unit 430 includes a phase diagnosing unit 441. The phase diagnosing unit 441 receives the voltage signal from the first comparator 410 and the current signal from the second comparator 420, like the logical operation unit 431. In response to the received voltage signal and the received current signal, the phase diagnosing unit 441 diagnoses the leading or lagging relation between the two signals. The phase diagnosing unit 441 delivers to the compensation unit 450 a phase diagnosis signal according to a diagnosed result.

The compensation unit 450 receives the phase comparison signal from the counter 432 and the phase diagnosis signal from the phase diagnosing unit 441. Also, the compensation unit 450 receives the position signal PST from the BLDC motor unit 300. As an example, the position signal PST may include a position error of a rotor according to an external condition and the driving condition of the BLDC motor. The compensation unit 450 may compensate for the position error of the received position signal PST in response to the phase comparison signal and the phase diagnosis signal.

As an example, the compensation unit 450 multiplies the phase comparison signal by a gain and adds a value obtained through the multiplication to the position signal PST, if the result of the phase diagnosis signal indicates leading, namely, if the phase of the voltage signal leads that of the current signal. On the contrary, if the result of the phase diagnosis signal indicates lagging, the phase comparison signal is multiplied by the gain and a value obtained through the multiplication is subtracted from the position signal PST.

Thus, the compensation unit 450 may output the compensated position signal PST'. The compensation unit 450 delivers the compensated position signal PST' to the motor driving unit 100 (See FIG. 1).

As described above, the BLDC motor system 10 according to the present invention may compensate for the position error of the rotor caused according to an external condition and the driving condition of the BLDC motor unit 300, through the position signal compensation unit. Thus, the BLDC motor system 10 may efficiently compensate for the position error of the rotor without a look-up table in which position compensation data is stored according to the condition of the BLDC motor and the external condition.

Also, although the BLDC motor system according to the present invention is described as a BLDC motor including position sensors that are based on hall sensor elements, the present invention is not limited thereto. In other words, the BLDC motor system may include a BLDC motor that is implemented in a sensor-less driving scheme not needing sensors. As an example, if the BLDC motor is implemented in the sensor-less driving scheme, a position signal output from the BLDC motor may be detected based on three-phase voltages that are output from an inverter.

The position signal compensation unit of the motor according to the present invention may automatically compensate for the position signal of the motor without compensating the position signal based on pre-stored position compensation data. Thus, a motor is provided which may automatically compensate the position signal of the motor irrespective of the external condition and the driving condition of the motor.

Hitherto, the best mode was disclosed in the drawings and specification. While specific terms were used, they were not used to limit the meaning or the scope of the present invention described in Claims, but merely used to explain the present invention. Accordingly, a person having ordinary skill in the art will understand from the above that various modifications and other equivalent embodiments are also possible. Hence, the real protective scope of the present invention shall be determined by the technical scope of the accompanying Claims.

What is claimed is:

1. A motor comprising:
a motor driving unit outputting a plurality of switching signals and one of estimated three-phase voltages, in response to a control signal and a compensated position signal;
a pulse width modulation (PWM) inverter outputting three-phase voltages and one of estimated three-phase currents corresponding to the one estimated phase voltage, in response to the plurality of switching signals;
a motor unit operating based on the three-phase voltages and outputting a position signal according to the operation; and
a position signal compensation unit receiving the position signal from the motor unit, the estimated phase voltage from the motor driving unit and the estimated phase current from the PWM inverter, detecting a phase difference between the estimated phase voltage and the estimated phase current, and compensating for the position signal in response to the detected phase difference to thereby generate the compensated position signal for the motor driving unit.

2. The motor of claim 1, wherein the motor unit comprises a plurality of position sensors, and the plurality of position sensors output the position signal based on a position of a rotor that is included in the motor unit.

3. The motor of claim 2, wherein the plurality of position sensors are provided based on hall elements.

4. The motor of claim 1, wherein the motor driving unit comprises:
a driving control unit outputting a control signal controlling a reference voltage, in response to the control signal and the compensated position signal;
a voltage generating unit generating the reference voltage in response to the control signal and outputting any one of the estimated three-phase voltages based on the reference voltage; and
a pulse modulating unit receiving the reference voltage and outputting the plurality of switching signals in response to the received reference voltage.

5. The motor of claim 4, wherein the driving control unit outputs the control signal that controls a frequency or an amplitude of the reference voltage.

6. The motor of claim 1, wherein the three-phase voltages have a form of a sinusoidal wave that includes a harmonic wave.

7. The motor of claim 1, wherein the motor unit follows a brushless direct current (BLDC) scheme.

8. A position signal compensation unit of a motor comprising:
a first comparator receiving any one of estimated three-phase voltages and outputting a voltage signal in response to comparing voltage levels of the received estimated phase voltage and a ground voltage;
a second comparator receiving any one of estimated three-phase currents and outputting a current signal in response to comparing current levels of the received estimated phase current and a ground current;
a first phase detecting unit detecting a phase difference between the voltage signal and the current signal;
a second phase detecting unit detecting phase diagnosis between the voltage signal and the current signal; and
a compensation unit receiving a position signal based on a position of a rotor included in the motor and compensating for the position signal in response to the detected phase difference and the detected phase diagnosis.

9. The position signal compensation unit of the motor of claim 8, wherein the first phase detecting unit comprises:
   a logical operation unit detecting a phase difference between the voltage signal and the current signal; and
   a counter detecting a count according to the phase difference and outputting the phase difference signal based on the detected count.

10. The position signal compensation unit of the motor of claim 9, wherein the logical operation unit is an exclusive OR (XOR) logical operator.

11. The position signal compensation unit of the motor of claim 8, wherein the phase diagnosis comprises information on whether a phase of the voltage signal leads or lags a phase of the current signal.

12. The position signal compensation unit of the motor of claim 8, wherein if a level of the received estimated phase voltage is higher or lower than a level of a ground voltage, the first comparator changes and outputs the level of the voltage signal, and if a level of the received estimated phase current is higher or lower than a level of a ground current, the second comparator changes and outputs the level of the current signal.

* * * * *